(12) United States Patent
Mizuno et al.

(10) Patent No.: US 10,933,777 B2
(45) Date of Patent: Mar. 2, 2021

(54) SEAT DEVICE FOR VEHICLE

(71) Applicant: AISIN SEIKI KABUSHIKI KAISHA, Kariya (JP)

(72) Inventors: Ryosuke Mizuno, Toyota (JP); Katsuya Nozue, Toyohashi (JP); Shogo Sakai, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 125 days.

(21) Appl. No.: 16/175,964

(22) Filed: Oct. 31, 2018

(65) Prior Publication Data
US 2019/0152355 A1  May 23, 2019

(30) Foreign Application Priority Data

Nov. 17, 2017 (JP) ............................. JP2017-222062

(51) Int. Cl.
*B60N 2/26* (2006.01)
*B60N 2/32* (2006.01)
*B60N 2/90* (2018.01)
*B60N 2/30* (2006.01)

(52) U.S. Cl.
CPC ............ *B60N 2/26* (2013.01); *B60N 2/3084* (2013.01); *B60N 2/3086* (2013.01); *B60N 2/32* (2013.01); *B60N 2/914* (2018.02); *B60N 2002/971* (2018.02)

(58) Field of Classification Search
None
See application file for complete search history.

(56) References Cited

U.S. PATENT DOCUMENTS

| 4,555,135 | A | | 11/1985 | Freeland | |
|---|---|---|---|---|---|
| 5,121,964 | A | * | 6/1992 | Fourrey | B60N 2/283 297/236 |
| 5,390,976 | A | * | 2/1995 | Doughty | B60N 2/793 297/115 |
| 5,542,742 | A | * | 8/1996 | Fulgenzi | B60N 2/3086 297/236 |
| 5,553,918 | A | * | 9/1996 | Baret | B60N 2/3081 297/237 |
| 6,820,913 | B2 | * | 11/2004 | Macey | B60N 2/06 296/65.01 |

(Continued)

FOREIGN PATENT DOCUMENTS

| DE | 10 2012 013 451 A1 | 1/2014 |
|---|---|---|
| JP | 8-11604 | 1/1996 |

(Continued)

OTHER PUBLICATIONS

Extended European Search Report dated Apr. 29, 2019 in European Patent Application No. 18206734.8, 7 pages.

*Primary Examiner* — David R Dunn
*Assistant Examiner* — Christopher E Veraa
(74) *Attorney, Agent, or Firm* — Oblon, McClelland, Maier & Neustadt, L.L.P.

(57) ABSTRACT

A seat device for a vehicle includes a baby back being a divided part of a seat cushion, the divided part being raised to form a backrest portion of a baby seat at a position facing a seatback, and a baby back airbag being provided at the baby back. The backrest portion of the baby seat is formed with a baby seat support shape in a seat width direction by an expansion of the baby back airbag.

15 Claims, 12 Drawing Sheets

(56) References Cited

U.S. PATENT DOCUMENTS

| | | | |
|---|---|---|---|
| 7,413,249 B2 | 8/2008 | Leutert | |
| 7,517,016 B1 * | 4/2009 | West | B60N 2/832 297/236 |
| 2002/0180249 A1 * | 12/2002 | Felton | A47C 7/14 297/284.6 |
| 2006/0279125 A1 * | 12/2006 | Leutert | B60N 2/3081 297/452.41 |
| 2007/0057551 A1 * | 3/2007 | Lachenmann | B60N 2/99 297/284.9 |
| 2007/0170758 A1 * | 7/2007 | Allen | B60N 2/2812 297/250.1 |
| 2008/0100109 A1 * | 5/2008 | Frank | A47D 1/00 297/238 |
| 2018/0134186 A1 | 5/2018 | Mizuno et al. | |
| 2018/0134190 A1 | 5/2018 | Mizuno et al. | |

FOREIGN PATENT DOCUMENTS

| | | |
|---|---|---|
| JP | 10-16618 | 1/1998 |
| JP | 2015-27410 | 2/2015 |
| JP | 2018-79800 | 5/2018 |
| JP | 2018-79820 | 5/2018 |

\* cited by examiner

SEAT DEVICE FOR VEHICLE

CROSS REFERENCE TO RELATED APPLICATIONS

This application is based on and claims priority under 35 U.S.C. § 119 to Japanese Patent Application 2017-222062, filed on Nov. 17, 2017, the entire content of which is incorporated herein by reference.

TECHNICAL FIELD

This disclosure generally relates to a seat device for a vehicle.

BACKGROUND DISCUSSION

A known seat device for a vehicle includes a seat for child which is retracted in a seat and which is deployed thereon. For example, the seat device disclosed in JPH8-11604A (hereinafter referred to as Patent reference 1) includes a movable member (a support body and a cushion body) which is a divided part of a seatback and which is inclined to form a cushion portion of a child seat on a seat cushion. As disclosed in U.S. Pat. No. 7,413,249 (hereinafter referred to as Patent reference 2), a seat device for vehicle in which a so-called balloon type child seat expanding by the filling of air is provided in a retracting chamber provided inside the seat. In Patent reference 2, the child seat expanded in the retracting chamber pushes a lid portion provided at a backrest surface of the seatback or a seating surface of a seat cushion to be deployed on the seat.

In addition, for example, a seat device in JPH10-16618A (hereinafter referred to as Patent reference 3) includes a movable member which is a divided part of a seat cushion to be raised. A backrest portion of a baby seat is provided at a position where the movable member opposes a seatback.

However, a retractable child seat of the aforementioned prior art has a problem in which it is difficult to secure an optimal support state for supporting a physical constitution of a child seated on the retractable child seat. That is, by the presetting of a large form in accordance with an estimation of the growth of the child, the seat supporting performance may be decreased. Because the term when the seat arranging function supporting the child occupant is employed may be limited by the restriction, there still is a room for improvement.

A need thus exists for a seat device for a vehicle which is not susceptible to the drawback mentioned above.

SUMMARY

According to an aspect of this disclosure, a seat device for a vehicle includes a baby back being a divided part of a seat cushion, the divided part being raised to form a backrest portion of a baby seat at a position facing a seatback, and a baby back airbag being provided at the baby back. The backrest portion of the baby seat is formed with a baby seat support shape in a seat width direction by an expansion of the baby back airbag.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
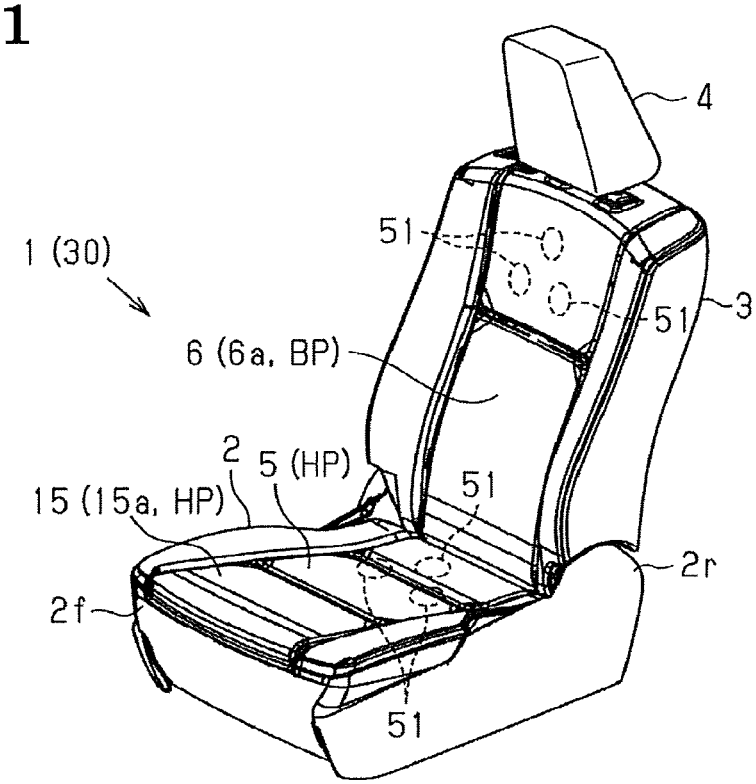
FIG. 1 is a perspective view of a seat (normal mode) according to an embodiment disclosed here.

A seat device for a vehicle of an embodiment will hereunder be explained with reference to the drawings. As illustrated in FIG. 1, the seat 1 for the vehicle includes a seat cushion 2 and a seatback 3 in a case where an occupant seated on the seat 1 is an adult. The seat cushion 2 is a portion of a seating portion HP. The seatback 3 is provided at a rear end portion 2r of the seat cushion 2. A headrest 4 is mounted on an upper end portion of the seatback 3 of a backrest portion BP of the seat 1.

Figure 2:
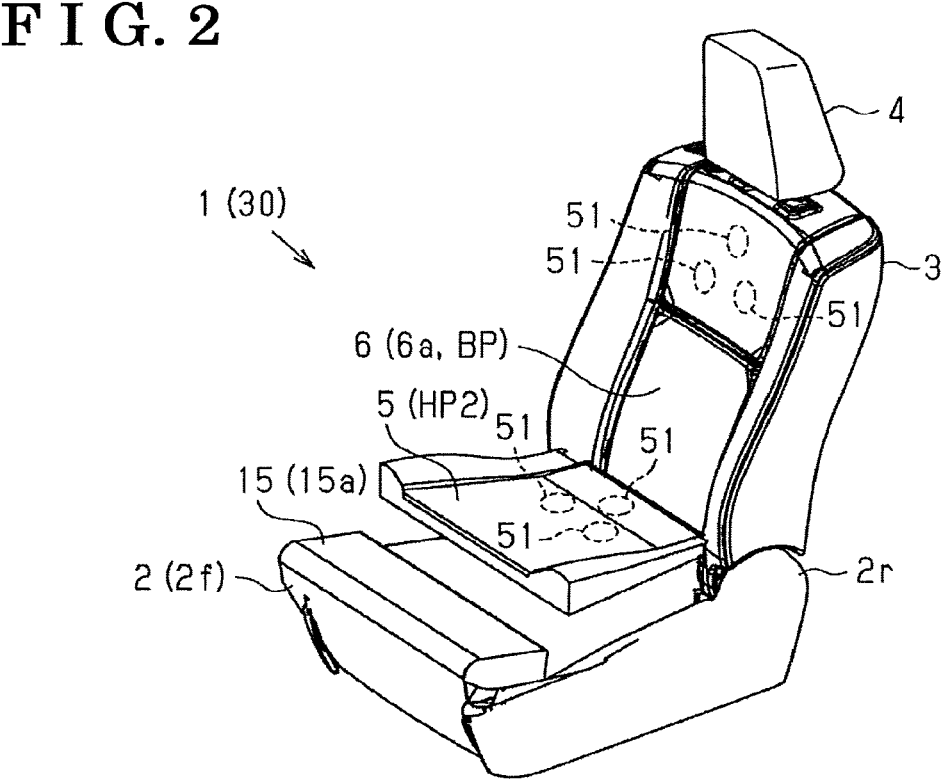
FIG. 2 is another perspective view of the seat (booster mode)

As illustrated in FIG. 2, the seat 1 in the embodiment includes a booster seat 5 which is a divided part of the seat cushion 2 to be moved upward from a normal mode Mgr (see FIG. 1, an adult mode) corresponding to a case where an adult occupant is seated. That is, in the seat 1 of the embodiment, the booster seat 5 which moves upward of the seat cushion 2 forms a seating portion HP2 for child. The seat 1 in the embodiment, accordingly, is shifted to be a booster mode Mbs corresponding to a child occupant (juvenile) who is relatively large.

Figure 3:
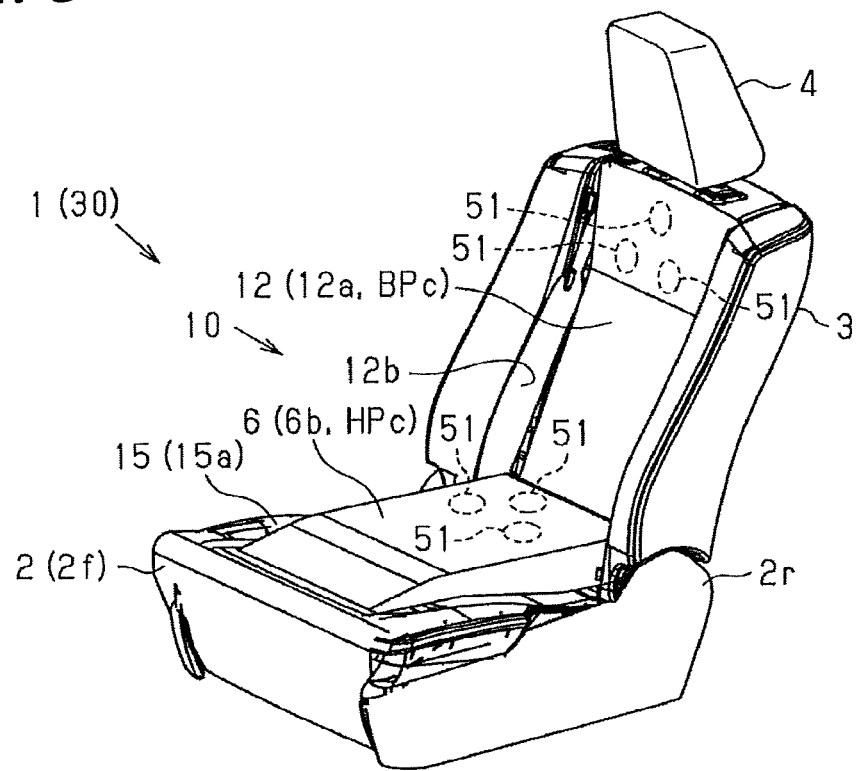
FIG. 3 is still another perspective view of the seat (child mode)
Figure 4:
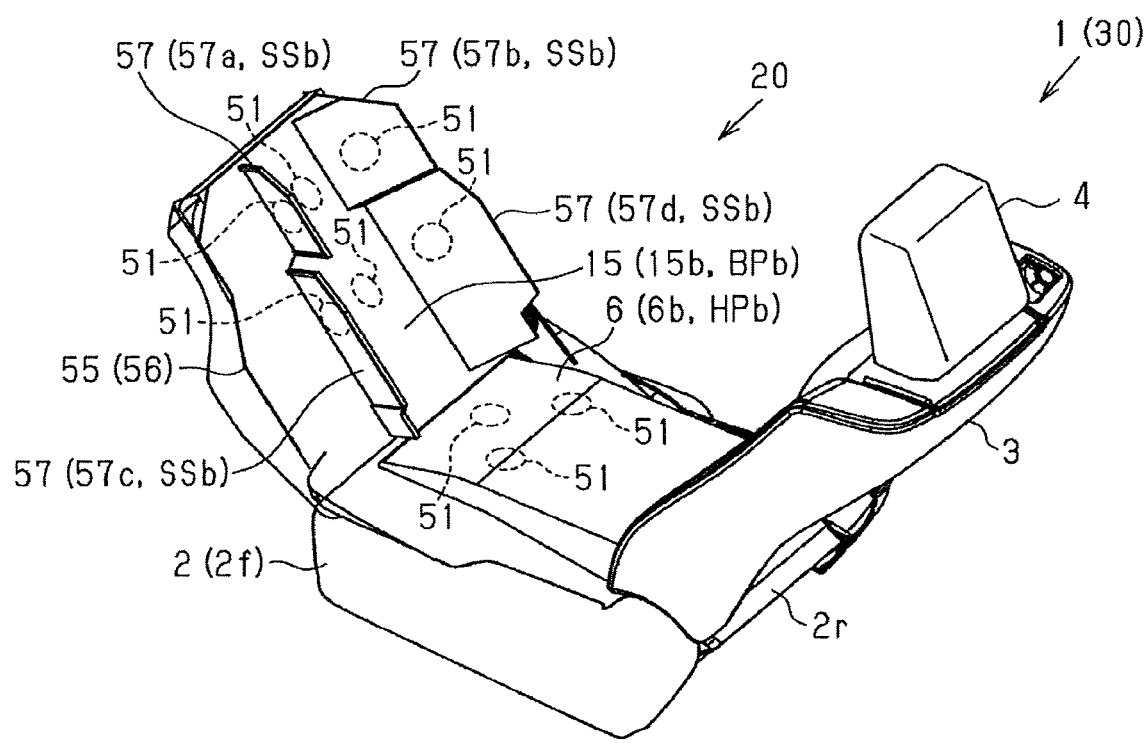
FIG. 4 is further perspective view of the seat (baby mode, seen from rear side)
Figure 5:
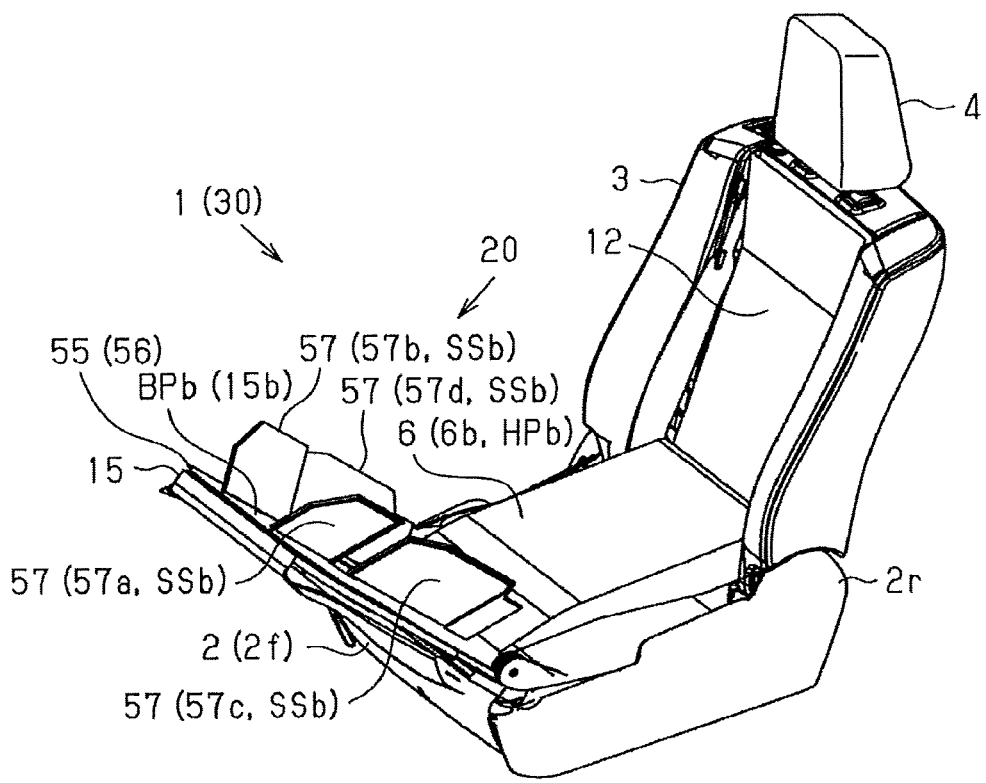
FIG. 5 is further perspective view of the seat (baby mode, seen from front side)
Figure 6:
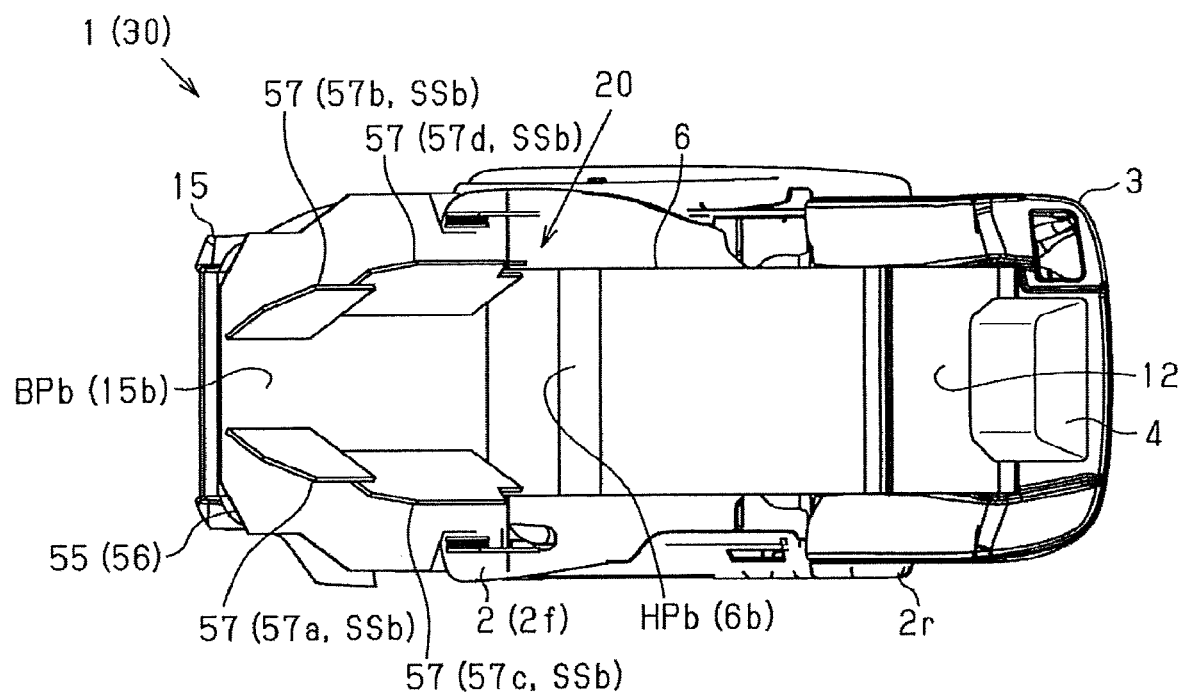
FIG. 6 is a plan view of the seat (baby mode)
Figure 7:
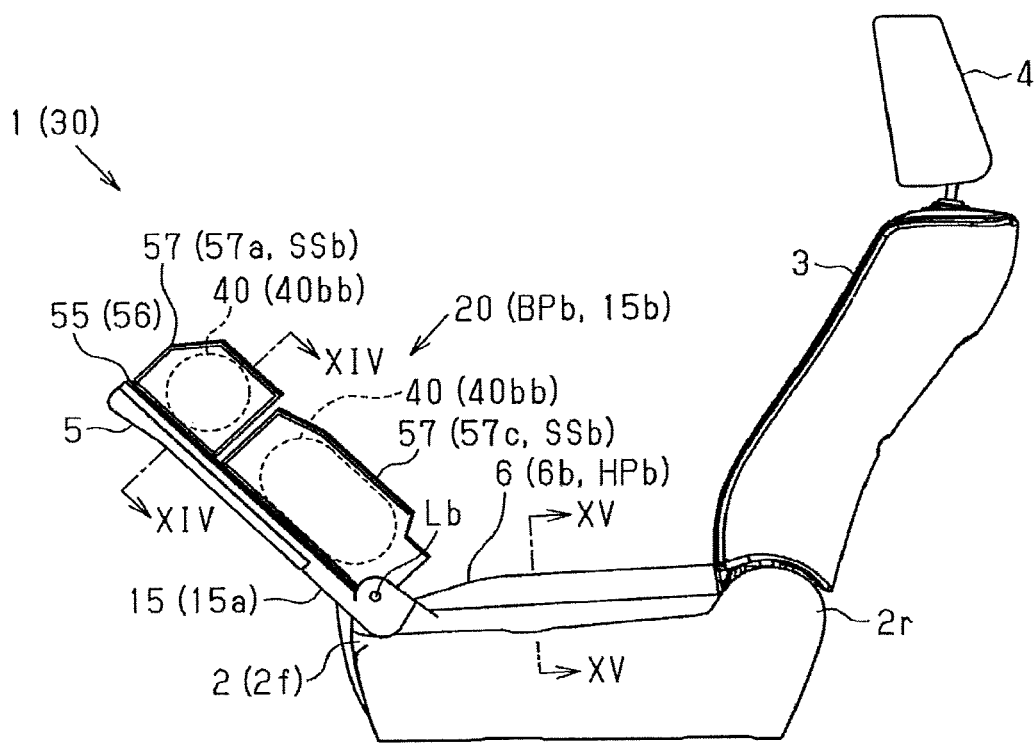
FIG. 7 is a side view of the seat (baby mode)

As illustrated in FIG. 3, the seat 1 in the embodiment includes a movable cushion 6 which is a divided part of the seatback 3 to be inclined on the seat cushion 2. In the seat 1 in the embodiment, the movable cushion 6 inclined on the seat cushion 2 is provided with a seating portion HPc of the child seat 10. That is, the seat 1 in the embodiment, accordingly, shifts to a child mode Mch in which the child occupant (an infant) is seated on a back surface 6b of the inclined movable cushion 6. The seatback 3 in the embodiment is provided with a recessed portion 12 accommodating the movable cushion 6 in a raised state at the normal mode Mgr and at the booster mode Mbs. In the child mode Mch, the recessed portion 12 provided at the seatback 3 includes a backrest portion BPc of a child seat 10 deployed on the seat 1.

As illustrated in FIGS. 4 to 7, the seat 1 in the embodiment is provided with a baby back 15 (a portion supporting a baby's back) which is the divided part of the seat cushion 2, the baby back 15 being raised on a front end portion 2f of the seat cushion 2. In the seat 1 in the embodiment, a back surface 15b of the baby back 15 being raised on the front end portion 2f of the seat cushion 2 is provided with a backrest portion BPb of the baby seat 20 at a position opposing the seatback 3. For convenience of description, the drawing of a cushion material of the back surface 15b of the baby back 15 will not be illustrated, the cushion material disposed at a cover or inside the cover of the back surface 15b. The seat 1 in the embodiment, accordingly, is shifted to be in a baby mode Mbb when the child occupant (infant) is seated on the baby seat 20 deployed on the seat 1.

Specifically, in the seat 1 in the embodiment, the movable cushion 6 provided at the seatback 3 is inclined on the seat cushion 2 in a state where the baby back 15 is raised. The back surface 6b of the inclined movable cushion 6, specifically, an end portion disposed in the vicinity of the baby back 15 includes a seating portion HPb of the baby seat 20.

That is, in the seat 1 in the embodiment, the child (infant) occupant is seated with his/her back toward the front, that is, a state where he/she faces the seatback 3, relative to the baby seat 20 deployed on the seat 1. The child on the baby seat 20 is supported such that he/she extends his/her feet on the back surface 6b of the movable cushion 6 of the seating portion HPb.

Next, the seat device 30 for the vehicle provided at the seat 1 of the embodiment by including the movable members (the booster seat 5, the movable cushion 6, the baby back 15), and seat arrange modes (Mch, Mbb, Mbs) of the seat device 30 will hereunder be explained in detail.

Figure 8:
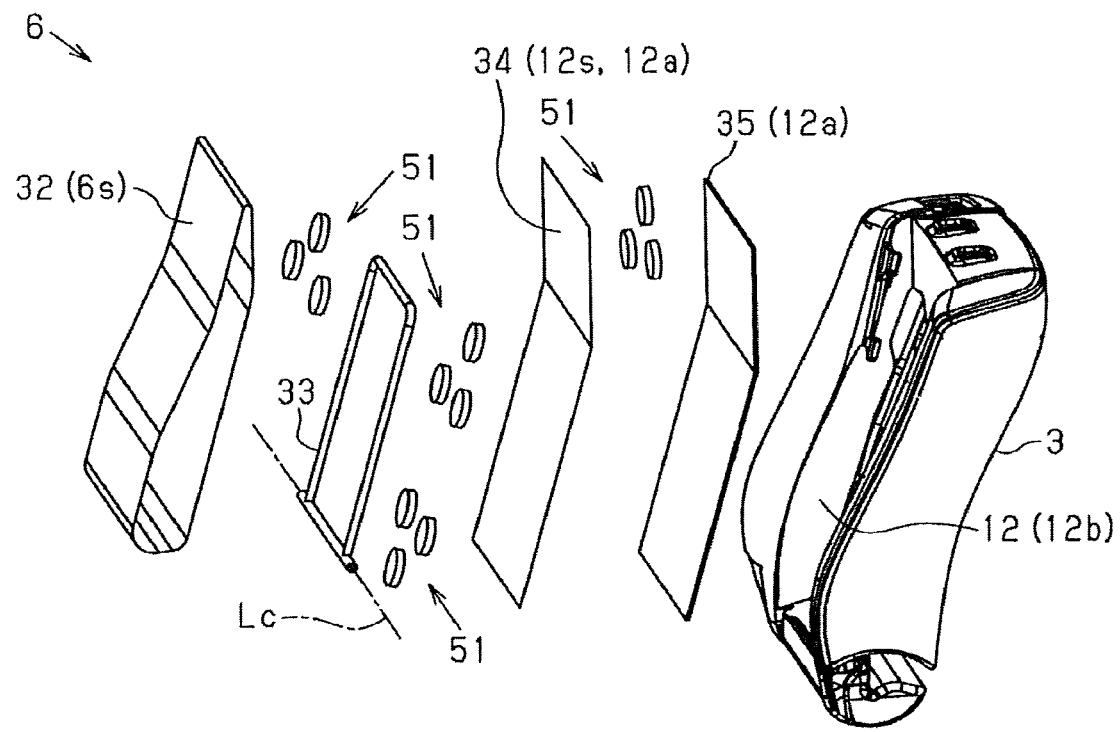
FIG. 8 is an exploded perspective view of a movable cushion provided at a seatback.

[Child mode] As illustrated in FIG. 8, the movable cushion 6 in the embodiment includes a cover 32 and a frame 33. The cover 32 is a part of an outer surface 6s. The frame 33 is made from a pipe. The movable cushion 6 is formed in a substantially board shape and is disposed with a cushion material inside the cover 32 while including the frame 33 as a strength retaining member.

Figure 9:
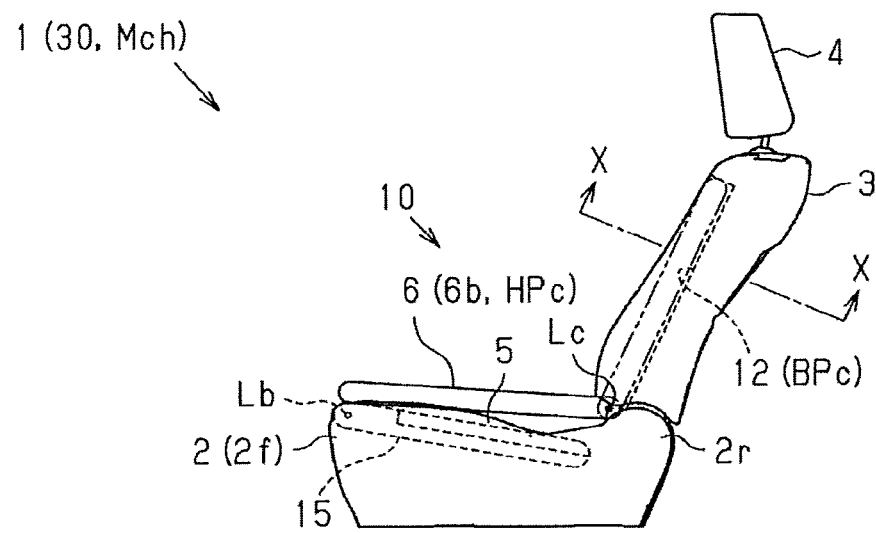
FIG. 9 is a motion explanation view of a seat device (child mode)

As illustrated in FIGS. 9 and 10, the seatback 3 in the embodiment includes the recessed portion 12 which is formed in a substantially C-shaped cross section and which accommodates the movable cushion 6 which is raised inside therein. Specifically, as illustrated in FIGS. 8 and 10, the seatback 3 in the embodiment includes a cover 34 and a fixation base 35 in a state where the movable cushion 6 is inclined toward the seat cushion 2. The cover 34 is a part of a design surface 12s of the recessed portion 12. The fixation base 35 is formed in a substantially plate shape disposed inside the cover 34. The seatback 3 in the embodiment includes a cushion material between the fixation base 35 and the cover 34 to form a bottom portion 12a of the recessed portion 12.

Figure 10A:
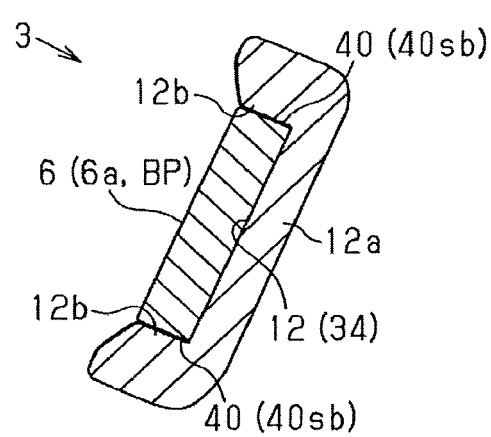
FIG. 10A is a cross sectional view of the seatback taken along line X-X in FIG. 9 when the movable cushion is retracted.
Figure 10B:
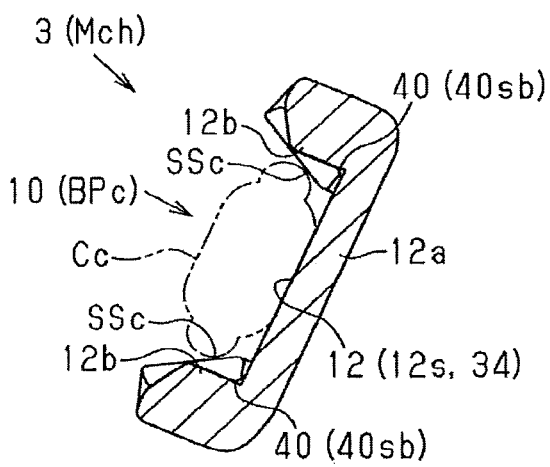
FIG. 10B is a cross sectional view of the seatback taken along line X-X in FIG. 9 in a child mode.

As illustrated in FIGS. 8 to 10, the movable cushion 6 in the embodiment is attached to the recessed portion 12 provided at the seatback 3 in a state where a lower portion of the frame 33 includes a rotary shaft Lc extending in a seat width direction (a direction orthogonal to a page in FIG. 9). The movable cushion 6 switches between a state of being integrally retracted with the seatback 3 (see FIG. 10A) and a state of being inclined toward the seat cushion 2 (see FIG. 10B) by rotating about the rotary shaft Lc.

As illustrated in FIG. 10B, the seatback 3 in the embodiment includes airbags 40 (seatback airbags 40sb) provided inside the cover 34 at portions corresponding to side wall portions 12b of the recessed portion 12. In the child mode Mch, by the expansion of the seatback airbags 40sb, a child seat support form SSc, that is, a side support portion in the seat width direction, is provided at the backrest portion BPc of the recessed portion 12 of the child seat 10.

Figure 11:
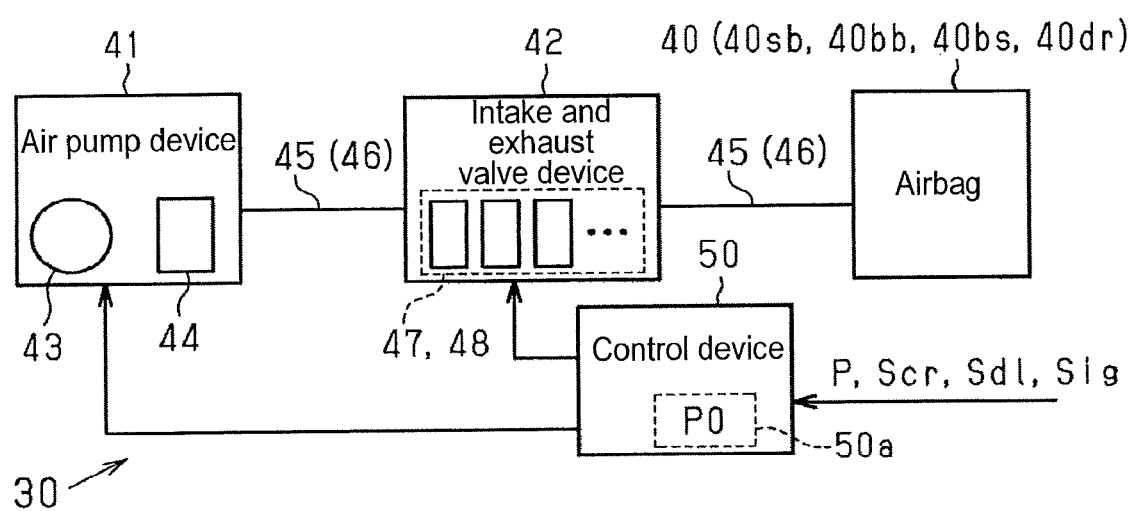
FIG. 11 is a schematic diagram of the seat device (airbag control system)

Specifically, as illustrated in FIG. 11, the seat device 30 in the embodiment includes the seatback airbags 40sb, an air pump device 41, and an intake and exhaust valve device 42. The seatback airbags 40sb are provided at the recessed portion 12 of the seatback 3. The air pump device 41 pressure-feeds air to the airbags 40 provided at the seat 1. The intake and exhaust valve device 42 is disposed between the airbags 40 and the air pump device 41. The air pump device 41 in the embodiment employs an electric pump driving a pump mechanism 44 by having a motor 43 as a drive source. The intake and exhaust valve device 42 is connected to the airbags 40 and the air pump device 41 via air tubes 45 which is made of resin having flexibility. That is, the seat device 30 in the embodiment includes an air flow path 46 communicating with the airbags 40 and the air pump device 41 by inner paths of the air tube 45 and an inner path of the intake and exhaust valve device 42. The intake and exhaust valve device 42 in the embodiment includes an intake valve 47 and an exhaust valve 48 which are disposed at a middle way of the flow path 46.

In the seat device 30 in the embodiment, a control device 50 controls the operations of the intake valve 47, the exhaust valve 48, and the air pump device 41. Specifically, the control device 50 in the embodiment is inputted with an inner pressure level P of the airbag 40, and an operation input signal Scr, an ignition signal Sig, or a door lock signal Sdl relative to an operation switch. The control device 50 in the embodiment controls the operation of the air pump device 41 and the intake and exhaust valve device 42 so as to expand and retract the airbags 40 based on the control signals of the control device 50.

Specifically, the control device 50 in the embodiment sets target values (inner pressure target values P0) relative to the inner pressures P of the airbags 40. The control device 50 retains the inner pressure target values P0 in a memory range 50a. In the seat device 30 in the embodiment, the inner pressure target values P0 of the airbags 40 are configured to be updated at any times by an user who sets an optimal seat support form by using an adjustment switch. That is, in the child mode Mch, the user (for example, a guardian) operates the airbags 40S to be expanded and retracted to set the optimal child seat support form SSc in the seat width direction in a state where the child occupant (infant occupant) C is seated on the child seat 10 deployed on the seat 1 so that the inner pressure target values P0 of the seatback airbags 40*sb* are memorized in the memory range 50*a*. The control device 50 in the embodiment controls the operation of the air pump device 41 and the intake and exhaust valve device 42 to match the detected inner pressures P of the airbags 40 for seat support with the inner pressure target values P0.

As illustrated in FIG. 8, the seat device 30 in the embodiment includes plural columnar elastic members 51 with a cushion material, the columnar elastic members 51 which are disposed inside the cover 32 of the outer surface 6S of the movable cushion 6 and which are disposed inside the cover 34 of the seat back 3 which is part of the design surface 12S of the recessed portion 12. Specifically, the columnar elastic members 51 are made from an elastic polymer material which is a complex of styrene-type plastic elastomer and paraffinic mineral oil. The columnar elastic members 51 are provided at positions where the occupant load may be concentrated in a case where the child occupant is seated on the seat 1 in the child mode Mch, and in the baby mode Mbb which will be explained below (see FIGS. 1 to 4). The seat device 30 in the embodiment may support the child occupant seated on the seat 1 stably while inhibiting the increase of the thickness of the cushion material disposed inside the covers 32, 34 by the columnar elastic members 51 dividing the load of the occupant.

Figure 12:
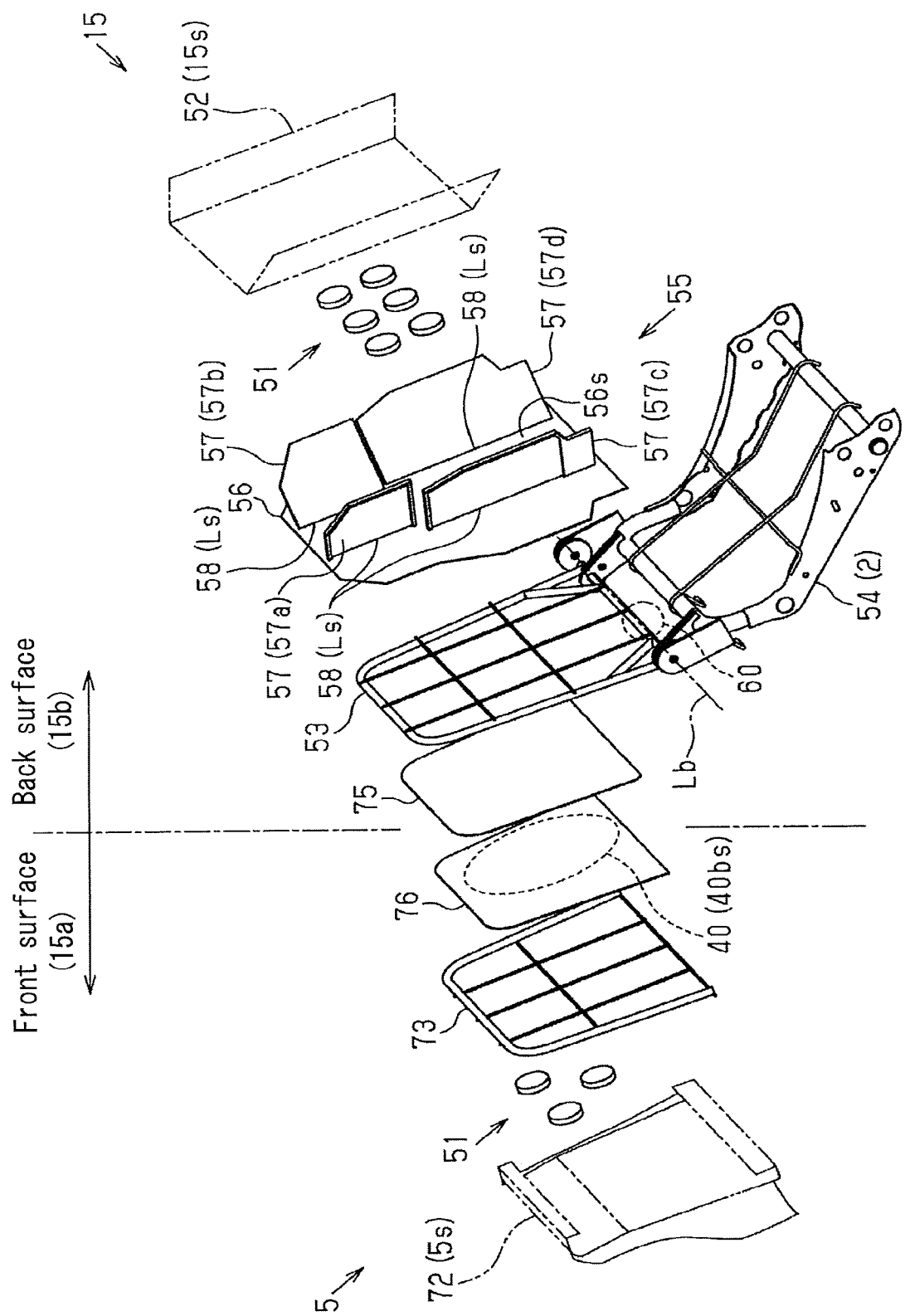
FIG. 12 is an exploded perspective view of a portion supporting a baby's back (hereinafter referred to as a baby back) and a booster seat provided at the seat cushion.

[Baby mode] As illustrated in FIG. 12, the baby back 15 in the embodiment includes a cover 52 and a frame 53. The cover 52 is a part of the outer surface 15*s*. The frame 53 is made from a pipe. For convenience of description, the cover 52 is schematically illustrated in FIG. 12. The baby back 15 is provided with the cushion material inside the cover 52 by having the frame 53 as a strength retaining member. The baby back 15 in the embodiment is configured such that the frame 53 is rotatably connected to a frame 54 of the seat cushion 2 at the front end portion 2*f* of the seat cushion 2.

The baby back 15 in the embodiment includes a baby support unit 55 provided at a back surface 6*b* facing the seatback 3 (right in FIG. 12) in a state of being raised on the front portion 2*f* of the seat cushion 2. The cover 52 covers the frame 53 fixed with the baby support unit 55 from the back surface 6*b* of the baby back 15 in addition to the cushion material disposed inside.

Specifically, the baby support unit 55 in the embodiment includes a base panel 56 and plural paddles 57. The base panel 56 is formed in a substantially flat plate shape. The plural paddles 57 are rotatably connected to the base panel 56. Specifically, the baby support unit 55 includes a pair of paddles 57*a*, 57*b* connected to the base panel 56 at two positions being away from each other while sandwiching a center portion in the seat width direction (see FIG. 6, in the upper lower direction). The baby support unit 55 includes a pair of paddles 57*c*, 57*d* connected to the base panel 56 at two positions away from each other while sandwiching the center portion in the seat width direction at positions close to a rotary shaft Lb of the baby back 15 relative to the paddles 57*a*, 57*b*. Each of the paddles 57 (57*a* to 57*d*) includes a substantially-rectangular flat plate shape, and is connected to a support surface 56*s* of the base panel 56 at a side portion thereof such that a connection portion 58 forms a rotary shaft Ls extending in a direction orthogonal to the rotary shaft Lb of the baby back 15 (see FIG. 6, in the right-left direction). In the baby back 15 in the embodiment, a cover 52 covering the baby support unit 55 is configured to expand at positions where the paddles 57 are provided by the rotation of the paddles 57 (57*a* to 57*d*) in a direction in which the paddles 57 (57*a* to 57*d*) are raised from the support surface 56*s* of the base panel 56 inside the cover 52 of the outer surface 15*s*.

Figure 13A:
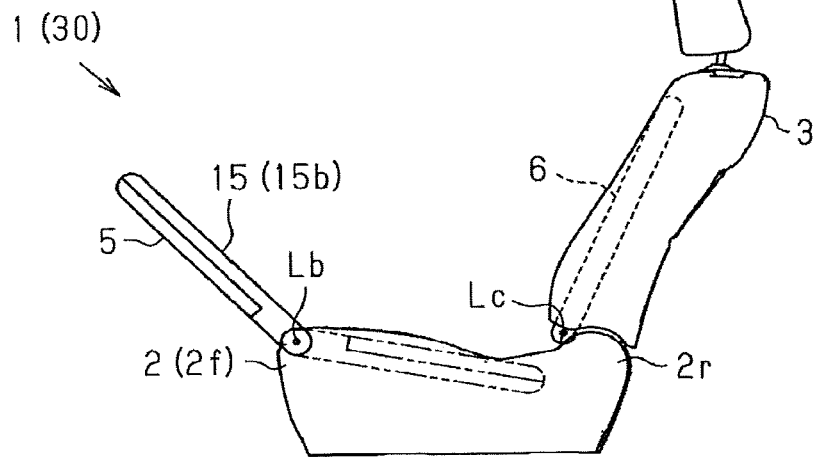
FIG. 13A is a motion explanation view of the seat device in baby mode when the baby back is raised.
Figure 13B:
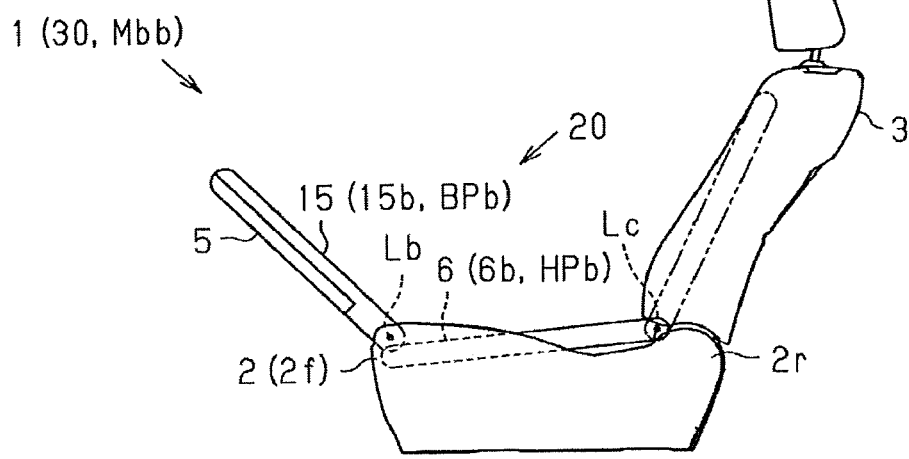
FIG. 13B is another motion explanation view of the seat device in baby mode when the movable cushion is inclined.

That is, as illustrated in FIG. 13A, the seat device 30 in the embodiment rotates the baby back 15 about the rotary shaft Lb provided at a front end portion 2*f* of the seat cushion 2 in a case where the seat 1 is shifted from the normal mode Mgr to the baby mode Mbb. As illustrated in FIG. 13B, the movable cushion 6 provided at the seatback 3 is inclined toward the seat cushion 2 in a state where the baby back 15 is raised on the front end portion 2*f* of the seat cushion 2 by the rotation of the baby back 15 about the rotary shaft Lb. Accordingly, the back surface 15*b* of the baby back 15 which is raised serves as a backrest portion BPb, and the baby seat 20 including the back surface 6*b* of the movable cushion 6 being inclined as a seat portion HPb is deployed on the seat 1.

Figure 13C:
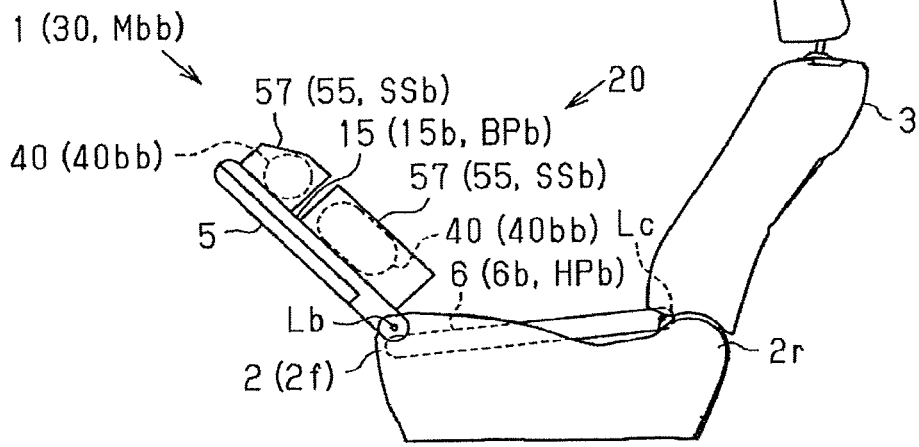
FIG. 13C is still another motion explanation view of the seat device in baby mode when paddles rotate.

As illustrated in FIG. 13C, in the seat device 30 of the embodiment, the paddles 57 (57*a* to 57*d*) of the baby support unit 55 provided at the baby back 15 rotate in a state where the baby seat 20 is deployed on the seat 1. Accordingly, a baby seat support form SSb in the seat width direction is formed at the backrest portion BPb of the baby back 15 of the baby seat 20.

Figure 14A:
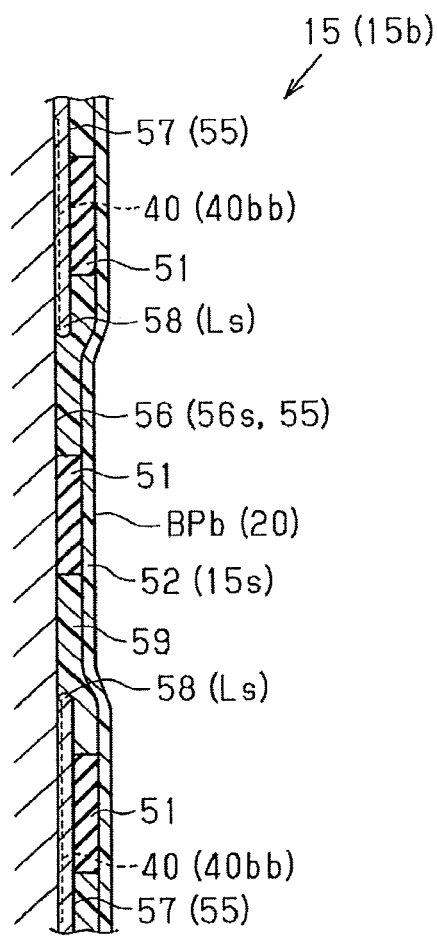
FIG. 14A is a cross sectional view of the baby back taken along line XIV-XIV in FIG. 7 when the airbag contracts.
Figure 14B:
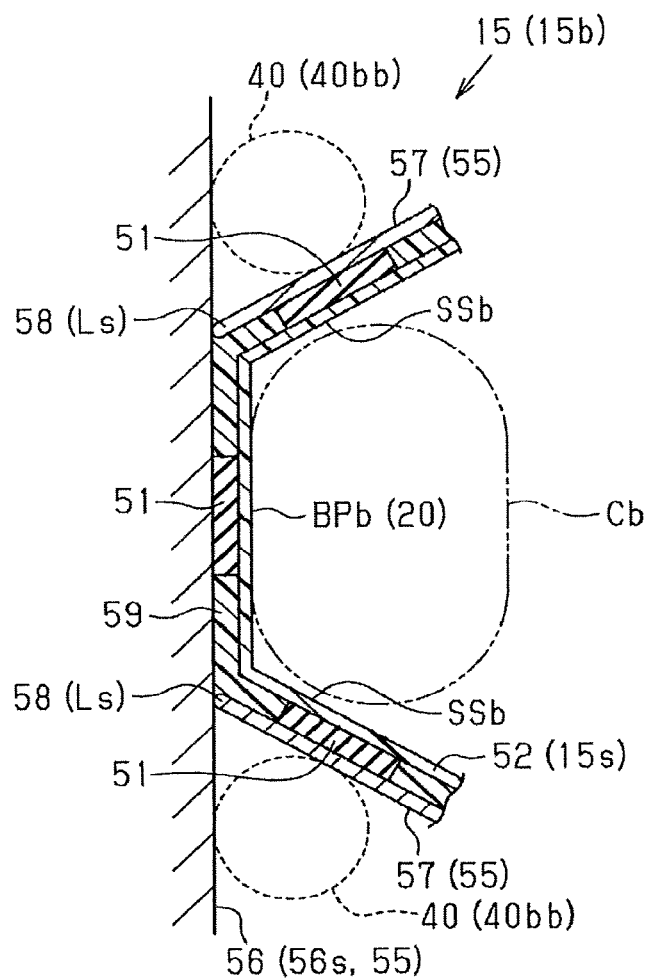
FIG. 14B is another cross sectional view of the baby back taken along line XIV-XIV in FIG. 7 when the airbag expands.

Specifically, as illustrated in FIGS. 13C, 14A and 14B, the seat device 30 in the embodiment includes the plural baby back airbags 40 (40*bb*) provided between the base panel 56 and the paddles 57 of the baby support unit 55. The baby back airbags 40*bb* expand and contract by the control device 50 controlling the operation of the air pump device 41 and the intake and exhaust valve device 42.

That is, as illustrated in FIG. 14B, in the seat device 30 in the embodiment, the paddles 57 are configured to rotate in a raised direction thereof by being pushed by the expanded baby back airbags 40*bb*. Accordingly, the baby seat support form SSb in which the child (infant) Cb seated on the baby seat 20 can be supported in the seat width direction at the backrest portion BPb of the baby back 15 of the baby seat 20.

As illustrated in FIGS. 14A and 14B, similarly to the movable cushion 6, the seat device 30 in the embodiment includes plural columnar elastic members 51 in addition to cushion materials 59 inside the cover 52 of the outer surface 15*s* of the baby back 15. Specifically, the baby back 15 in the embodiment includes the columnar elastic members 51 disposed between the cover 52 and the paddles 57. The baby back 15 includes the columnar elastic member 51 provided between the cover 52 and the base panel 56 at the center portion of the left and right paddles 57 in the seat width direction.

Figure 15:
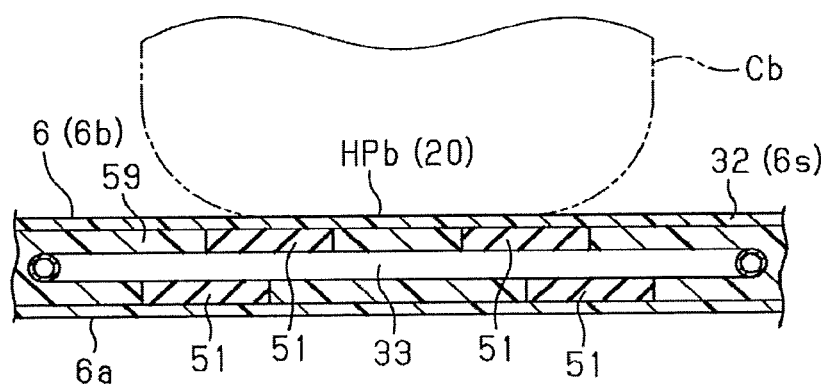
FIG. 15 is a cross sectional view of the movable cushion taken along line XV-XV in FIG. 7.

As illustrated in FIG. 15, the seat device 30 in the embodiment is configured such that the child Cb as an occupant is seated on the columnar elastic members 51 in addition to the cushion material 59 provided at the back surface 6*b* of the movable cushion 6 which forms the seat portion HPb of the baby seat 20 in the baby mode Mbb. That is, the child Cb as an occupant of the baby seat 20 is seated on the back surface 6*b* of the movable cushion 6 at a position away from the seatback 3 (see FIG. 4). Thus, the movable cushion 6 of the embodiment includes the plural columnar elastic members 51 provided at a distal end of the movable cushion 6 (see FIG. 8). The seat device 30 of the embodiment is configured to secure the stable support state of the child Cb seated on the baby seat 20 by the columnar elastic members 51 dividing the occupant load.

On the other hand, a child Cc serving as an occupant of the child seat 10 is seated on the back surface 6b of the movable cushion 6 at a position close to the seatback 3 (see FIG. 3). Thus, the movable cushion 6 of the embodiment includes the columnar elastic members 51 at a proximal end of the movable cushion 6 (see FIG. 8). Accordingly, in the child mode Mch as well, the seat device 30 in the embodiment secures the stable support state of the child Cc seated on the child seat 10.

As illustrated in FIG. 12, the seat device 30 in the embodiment includes a lock device 60 that can retain the baby back 15 in a raised state at the front end portion 2f of the seat cushion 2.

Figure 16A:
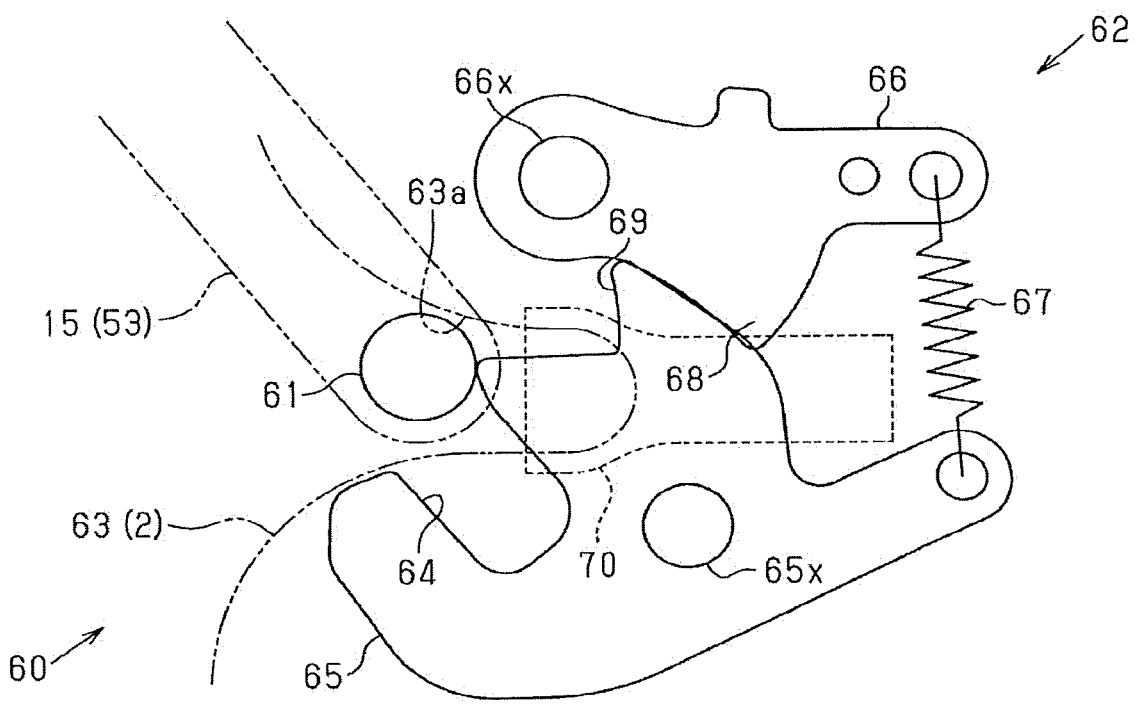
FIG. 16A is a motion explanation view of a lock device holding the baby back in a raised state when the lock device is in an unlock state.
Figure 16B:
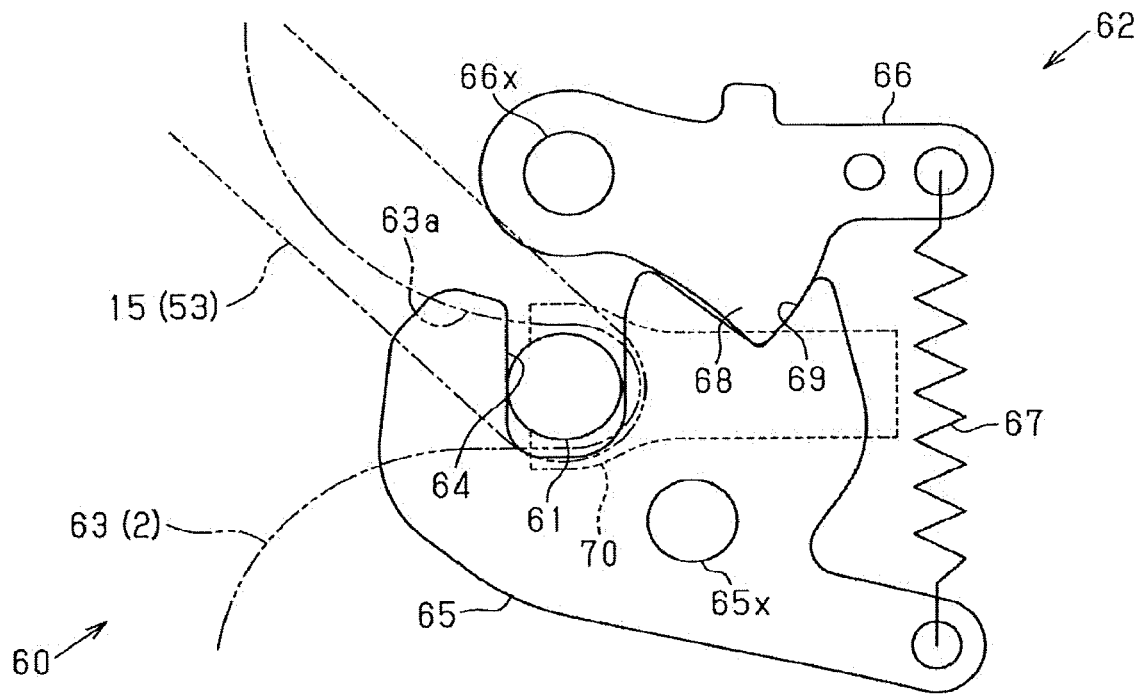
FIG. 16B is another motion explanation view of a lock device holding the baby back in the raised state when the lock device is in a lock state.

Specifically, as illustrated in FIGS. 16A and 16B, the lock device 60 in the embodiment includes a striker 61 and a latch mechanism 62. The striker 61 is provided at the baby back 15. The latch mechanism 62 is provided at the seat cushion 2. That is, the lock device 60 of the embodiment is configured such that the latch mechanism 62 provided at the seat cushion 2 engages with the striker 61 provided at the baby back 15 by the shifting of the baby back 15 in the raised state by the rotation of the baby back 15 about the rotary shaft Lb provided at the front end portion 2f the seat cushion 2 (see FIG. 13). Accordingly, the baby back 15 being raised on the front end 2f of the seat cushion 2 is unrotatably locked.

Specifically, the lock device 60 of the embodiment is configured such that the striker 61 is provided at the frame 53 that serves as the strength retaining member of the baby back 15. Specifically, in a case where the baby back 15 rotates in the raised direction, the striker 61 is provided at a position moving towards a rear side from a front side of the seat cushion 2 (in FIG. 16 from left to right) at the lower portion of the rotary shaft Lb. The latch mechanism 62 in the embodiment is configured to be disposed at a position engageable with the moving striker 61 in a state where a bracket 63 is fixed to, for example, the frame 54 of the seat cushion 2.

More specifically, the bracket 63 of the latch mechanism 62 in the embodiment is provided with a slit 63a into which the striker 61 moving as described above enters. The latch mechanism 62 includes a latch member 65 rotatably and axially supported about a support shaft 65x while having a striker engagement groove 64 with which the striker 61 engages, the striker 61 entering into the slit 63a. The latch mechanism 62 includes a pawl member 66, similarly to the latch member 65, rotatably and axially supported about a support shaft 66x. The latch mechanism 62 in the embodiment is configured to inhibit the latch member 65 from rotating by the engagement of the pawl member 66 with the latch member 65, the latch member 65 in which the striker 61 engages with the striker engagement groove 64.

Specifically, the latch mechanism 62 of the embodiment includes a tensile coil spring 67 including a first end that is hooked to the latch member 65 and a second end that is hooked to the pawl member 66. The latch mechanism 62 in the embodiment is configured such that the latch member 65 is biased in the anti-clockwise direction in FIGS. 16A and 16B, and the pawl member 66 is biased in the clockwise direction in FIGS. 16A and 16B.

The latch member 65 is pressed by the striker 61 engaged with the striker engagement groove 64 to rotate in the clockwise direction in FIG. 16 against the biasing force of the tensile coil spring 67 (see FIG. 16A). The pawl member 66 is provided with an engagement protrusion 68 being slidingly in contact with an outer periphery of the latch member 65 by rotating in response to the biasing force of the tensile coil spring 67. The latch mechanism 62 of the embodiment is configured such that the engagement protrusion 68 of the pawl member 66 is engaged with an engagement recessed portion 69 provided at an outer periphery of the latch member 65 in a state where the striker 61 moves to a position in which the baby back 15 is shifted in a raised state (see FIG. 16B).

That is, the latch mechanism 62 in the embodiment is configured such that the latch member 65 is inhibited from rotating toward the anti-clockwise direction in FIG. 16, that is, a direction in which the striker 61 is disengaged from the striker engagement groove 64, based on the engagement force of the engagement protrusion 68 of the pawl member 66 and the engagement recessed portion 69 of the latch member 65. The lock device 60 in the embodiment may inhibit the baby back 15 including the striker 61 from rotating.

The latch mechanism 62 in the embodiment is provided with a rubber damper 70 serving as an elastic member being pressed by the striker 61 engaged with the latch mechanism 62. The rubber damper 70 inhibits the striker 61 being engaged with the latch mechanism 62 from moving that is, inhibits the baby back 15 retained in a raised state from backlashing, in response to the elastic restoring force by being pressed by the striker 61 to be elastically deformed.

Figure 17:
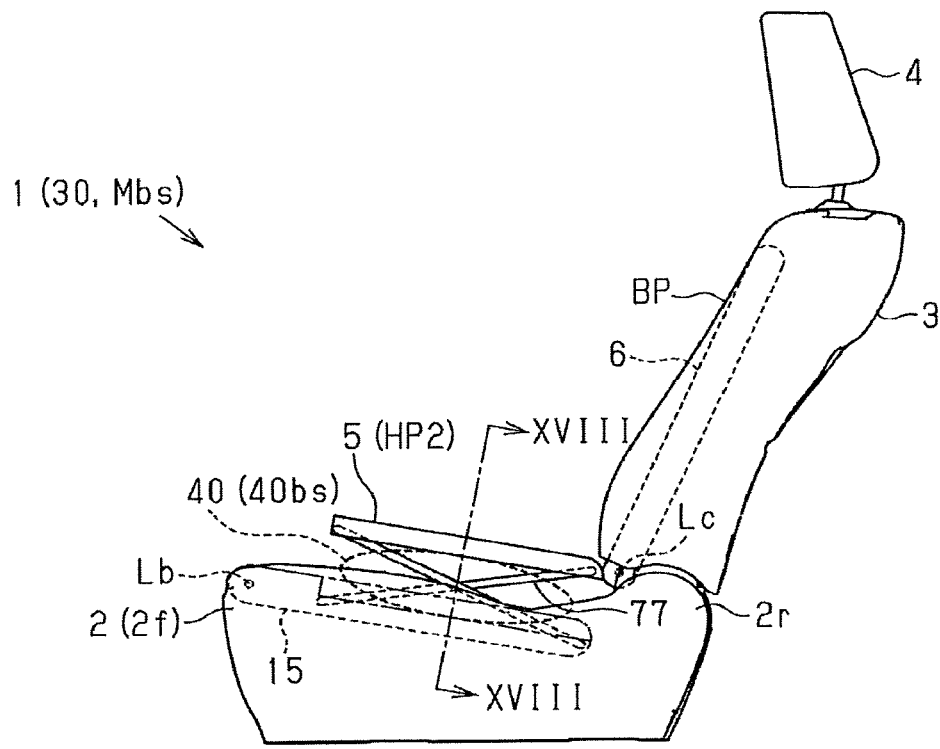
FIG. 17 is a motion explanation view of the seat device (booster mode)
Figure 18:
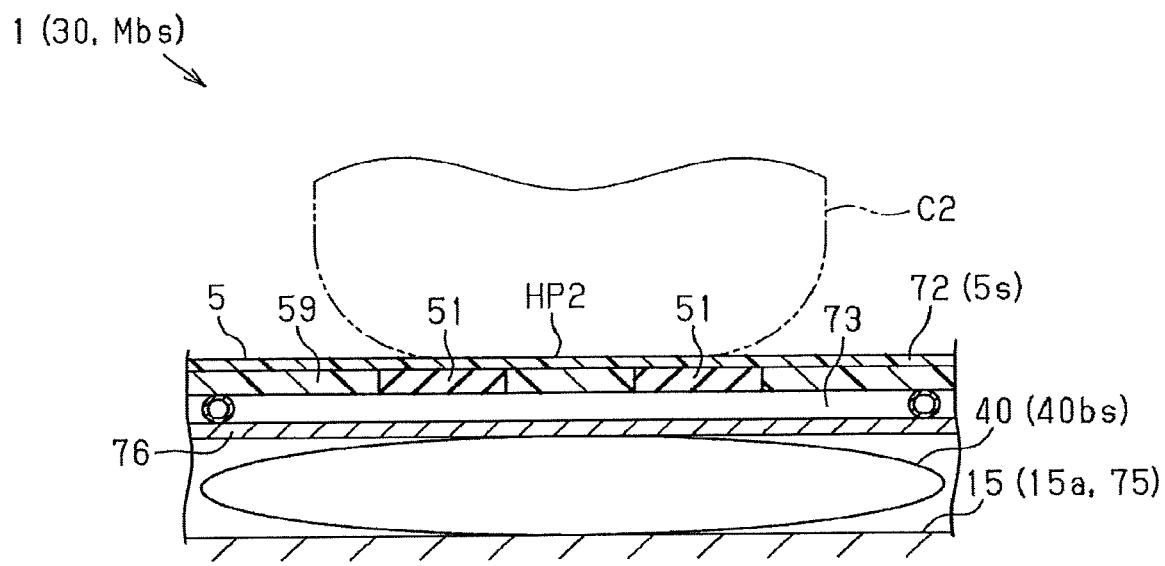
FIG. 18 is a cross sectional view of the booster seat taken along line XVIII-XVIII in FIG. 17.

[Booster mode] as illustrated in FIGS. 12, 17, and 18, the booster seat 5 in the embodiment is provided at a front surface 15a of the baby back 15 forming the seat portion HP of the seat 1 in a state where the baby back 15 is integrally retracted with the seat cushion 2. The booster seat 5 moves upward of the seat cushion 2 to be away from the baby back 15. By the forming of the seat portion HP2 for child by the booster seat 5 moving upward of the seat cushion 2, the seat device 30 in the embodiment is shifted in a booster mode Mbs supporting a relatively larger child C.

Specifically, as illustrated in FIG. 12, the booster seat 5 in the embodiment includes a cover 72 of the outer surface 5s, and the frame 73 made from a pipe. The booster seat 5 includes a cushion material inside the cover 72 while having the frame 73 as a strength retaining member.

In the seat device 30 in the embodiment, the booster seat 5 includes the plural columnar elastic members 51 disposed inside the cover 72 with the cushion member. As illustrated in FIG. 8, the plural columnar elastic members 51 are provided at a surface 6a of the movable cushion 6 which is integrally retracted with the seatback 3 to form the backrest portion BP of the seat 1. As illustrated in FIGS. 1 and 2, in the normal mode Mgr in which the booster seat 5 is provided with the seat portion HP of the seat 1, and the booster mode Mbs in which the booster seat 5 is provided with the seat portion HP2 for a physically large child C2, the stable support state is secured by the columnar elastic members 51 that divide the occupant load.

As illustrated in FIG. 12, the seat deice 30 of the embodiment is provided with a flat-plate-shaped base plate 75 fixed to the frame 53 at the surface 6a of the baby back 15, and a flat-plate-shaped base plate 76 fixed to the frame 73 of the booster seat 5 at a position facing the base plate 75. In the seat device 30 in the embodiment, the airbag 40 (a booster seat airbag 40bs) is provided between the two base plates 75,76. In the seat device 30 of the embodiment, the booster seat airbag 40bs expands and contracts by the operation of the air pump device 41 and the intake and exhaust valve device 42 (see FIG. 11).

That is, as illustrated in FIGS. 17 and 18, in the seat device 30 in the embodiment, the booster seat airbag 40*bs* as a drive portion provided between the baby back 15 and the booster seat 5 expands to move the booster seat 5 pressed by the booster seat airbag 40*bs* above the seat cushion 2. In the seat device 30 in the embodiment, (the frame 53 of) the baby back 15 and (the frame 73) of the booster seat 5 are connected with each other via an X link 77. Accordingly, the booster seat 5 on which the child C2 who is relatively large is seated may be stably supported at a position which is moved upward of the seat cushion 2.

Next, advantages and effects of the embodiment will hereunder be explained.

The seat device 30 includes the baby back 5 and the airbags 40 (the baby back airbags 40*bb*). The baby back 15 is the divided part of the seat cushion 2, the divided part being raised to form the backrest portion BPb of the baby seat 20 at the position opposing the seatback 3. The airbags 40 (the baby back airbags 40*bb*) are provided at the baby back 5. The seat device 30 includes the baby seat support shape SSb in the seat width direction at the backrest portion BPb of the baby seat 20 by expanding the baby back airbags 40*bb*.

According to the aforementioned configuration, by the raising of the baby back 15 retracted in the seat cushion 2, the seat device 30 may be easily shifted in the baby mode Mbb supporting a case where the occupant corresponds to the child (infant) Cb by the deployment of the baby seat 20 on the seat 1. Here, the raised baby back 15 includes the backrest portion BPb of the baby seat 20 at the position facing the seatback 3 to secure enhanced security performance. In a case where the baby seat 20 is not used, the baby back 15 may be retracted compactly in a state of being integrally provided with the seat cushion 2.

The baby back airbags 40*bb* provided at the baby back 15 are expanded to include the baby seat support shape SSb in the seat width direction optimally suited for the physical constitution of the child corresponding to the occupant at the backrest portion BPb of the baby seat 20. The load of the occupant applied on the backrest portion BPb may be securely supported by the baby back 15 which relatively easily secures the strength. Accordingly, according to the aforementioned configuration, the child occupant seated on the baby seat 20 may be favorably supported.

The baby back 15 may be compactly retracted relative to the seat cushion 2 by the contraction of the baby back airbags 40*bb*. Accordingly, the thickness of the seat cushion 2 including the baby back 15 may be inhibited from being increased.

The baby back 15 includes the paddles 57 (57*a* to 57*d*) forming the baby seat support shape SSb of the backrest portion BPb by being pressed by the expanding baby back airbags 40*bb* to be rotated.

According to the aforementioned configuration, the baby seat support shape SSb of the backrest portion BPb being formed by the expansion of the baby back airbags 40*bb* may easily secure the enhanced support strength. Furthermore, the reproduction of the baby seat support shape SSB may be enhanced. Accordingly, the enhanced support performance in the seat width direction may be favorably applied on the backrest portion BPb of the baby seat 20 deployed on the seat 1.

The baby back 15 is rotatably connected to the front end portion 2*f* of the seat cushion 2. According to the aforementioned configuration, the baby back 15 is raised on the front end portion 2*f* of the seat cushion 2 to form the backrest portion BPb of the baby seat 20 at the position opposing the seatback 3 by the rotation of the baby back 15. In a case where the baby seat 20 is not used, the baby back 15 is inclined to be easily retracted. Thus, the convenience may be enhanced.

The seat device 30 includes the striker 61 provided at the baby back 15, and the latch mechanism 62 provided at the seat cushion 2. The latch mechanism 62 retains the baby back 15 in the raised state by being engaged with the striker 61 in a case where the baby back 15 is raised. The latch mechanism 62 includes the rubber damper 70 serving as an elastic body being pressed by the striker 61 which is engaged with the latch mechanism 62.

According to the aforementioned configuration, the baby back 15 may be retained in a raised state easily with the simple structure. The rubber damper 70 is pressed to be elastically deformed so that the striker 61 engaged with the latch mechanism 62 is inhibited from moving, that is, the baby back 15 retained in the raised state may be inhibited from being backlashed. Accordingly, the enhanced quality may be secured.

The seat device 30 includes the movable cushion 6 which is the divided part of the seatback 3, the divided part being inclined to form the seat portion HPb of the baby seat 20. According to the aforementioned construction, the movable cushion 6 integrally retracted with the seatback 3 is inclined so that the seat portion HPb supporting the occupant of the child (infant) Cb seated on the baby seat 20 may be easily formed. In a case where the baby seat 20 is not used, the movable cushion 6 is raised to be integrally provided with the seatback 3 so that the movable cushion 6 may be easily and compactly retracted.

The seat device 30 is configured such that the movable cushion 6 is inclined in a state where the baby back 15 is integrally retracted with the seat cushion 2 so as to include the seat portion HPc of the child seat 10 on the seat 2. Here, the recessed portion 12 provided at the seatback 3 by the inclination of the movable cushion 6 is provided with the backrest portion BPc of the child seat 10.

According to the aforementioned configuration, the movable cushion 6 retracted in the seatback 3 is inclined on the seat cushion 2 so that the child seat 10 may be easily deployed on the seat 1. Accordingly, the seat device 30 may be shifted to the child mode Mch supporting a case where the occupant corresponds to the child (infant) Cc. In a case where the child seat 10 is not used, the movable cushion 6 may be easily and compactly retracted by being raised to be integrated with the seatback 3.

The movable cushion 6 corresponds to the seat portion HPb of the baby seat 20 and the seat portion HPc of the child seat 10 so that the structure may be simplified. Because the child Cb and the child Cc serving as occupants seat on the different positions relative to the movable cushion 6 (the baby seat: front end side, the child seat: proximal end side), the optimal support structure may be set.

The side wall portion 12*b* of the recessed portion 12 provided at the seatback 3 may apply the favorable support performance in the seat width direction to the seatback portion BPc of the child seat 10 formed with the recessed portion 12. Accordingly, the child occupant seated on the child seat 10 may favorably be supported.

The seatback 3 is provided with the seatback airbags 40*sb* forming the child seat support form SSc at the seatback portion BPc of the child seat 10 formed with the recessed portion 12 in the seat width direction by expanding inside the recessed portion 12.

According to the aforementioned configuration, the seatback airbags 40*sb* provided at the recessed portion 12 of the seatback 3 expand to form the optimal child seat support form SSC that suits for the physical constitution of the child (infant) seated on the child seat 10 in the seat width direction at the backrest portion BPc of the child seat 10 formed with the recessed portion 12. Accordingly, the favorable support performance in the seat width direction may be applied.

The seat device 30 includes the booster seat 5, the booster seat 5 being the divided part of the seat cushion 2, the divided part moving upward from a state where the baby back 15 is integrally retracted with the seat cushion 2.

According to the aforementioned configuration, the booster seat 5 moved upward of the seat cushion 2 constitutes the seat portion HP2 for the child. Accordingly, the child occupant may favorably be supported by the shifting of the seat device 30 to the booster mode Mbs supporting a case where the occupant corresponds to a relatively large child (juvenile). In a case of not being used, the booster seat 5 moves downward to be integrated with the seat cushion 2 to be easily and compactly retracted.

The booster seat 5 is provided at the baby back 15 and moves upward of the seat cushion 2 by the expansion of the booster seat airbag 40bs which is provided between the baby back 15 and the booster seat 5 and which presses the booster seat 5.

According to the aforementioned configuration, the booster seat 5 may be moved upward with the simple configuration. By the integration with the baby back 15 with the booster seat airbag 40bs serving as a drive portion, the booster seat 5 may be compactly retracted.

The aforementioned embodiment may be modified as follows. The aforementioned embodiment and modified examples below may be combined to the extent that they do not contradict technically.

According to the aforementioned embodiment, the seat device 30 includes the booster seat 5, the movable cushion 6, and the baby back 15. The seat device 30 includes the three arrangement modes of the seat (Mch, Mbb, Mbs) supporting a case where the occupant corresponds to the child in addition to the normal mode Mgr supporting a case where the occupant corresponds to the adult, in accordance with the movement state of the booster seat 5, the movable cushion 6, and the baby back 15. Alternatively, the seat device 30 may include less number of the arrangement modes of the seat. For example, one of the child mode Mch and the booster mode Mbs may be provided in addition to the baby mode Mbb. Only the baby mode Mbb may be provided. The both of the child mode Mch and the booster mode Mbs may be provided, or one of the child mode Mch and the booster mode Mbs may be provided.

According to the aforementioned embodiment, the baby back 15 rotates about the rotary shaft Lb provided at the front end portion 2f of the seat cushion 2. Alternatively, how the divided part (the baby back 15) of the seat cushion 2 is raised may be freely changed, for example, the divided part (the baby back 15) of the seat cushion 2 may be removed once, and then attached to the seat cushion 2 in a raised state. As long as the seatback portion BPb of the baby seat 20 is formed at the position facing the seatback 3, the position of the seat cushion 2 where the baby back 15 is raised may be rearward relative to the front end portion 2f.

According to the aforementioned embodiment, the movable cushion 6 which is the divided part of the seatback 3 is inclined to form the seat portion HPb of the baby seat 20 in the baby mode Mbb, and forms the seat portion HPc of the child seat 10 in the child mode Mch. Alternatively, in the baby mode Mbb, for example, the baby back 15 which is a divided part of the seat cushion 2 may be raised to form a recessed portion at the seat cushion 2, and the recessed portion may constitute the seat portion HPb of the baby seat 20. For example, the seat portion HPb of the baby seat 20 may be formed by the attachment of a cushion retracted in, for example, a back surface portion of the seatback 3 to the seat cushion 2 in a state where the baby back 15 is raised.

According to the aforementioned embodiment, the airbags 40 (the baby back airbags 40bb) are disposed between the base panel 56 and the paddles 57 (57a to 57d) of the baby support unit 55. The paddles 57 pressed by the expanded baby back airbags 40bb rotate in the raised direction so that the baby seat support shape SSb is formed in the seat width direction at the backrest portion BPb of the baby seat 20 formed with the baby back 15. Alternatively, the expanded airbags 40 may form the baby seat support shape SSb in the seat width direction at the backrest portion BPs of the baby seat 20 without the paddles 57. The paddles 57 may rotate by methods other than the air pressure, for example, by a motor, a spring, or a manual adjustment mechanism to form the baby seat support shape SSb at the back rest portion BPb of the baby seat 20 in the seat width direction.

According to the aforementioned embodiment, the booster seat 5 is provided at the front surface 15a of the baby back 15. The booster seat airbag 40bs provided between the baby back 15 and the booster seat 5 expands to press the booster seat 5 upward of the seat cushion 2. Alternatively, the booster seat 5 may be provided at the seat cushion 2 separately from the baby back 15. The booster seat 5 may be moved upward by methods using other than the air pressure, for example, by a motor, a spring, or a manual adjustment mechanism.

According to the aforementioned embodiment, the lock device 60 for retaining the baby back 15 in the raised state is provided by the striker 61 provided at the baby back 15 and the latch mechanism 62 provided at the sheet cushion 2. Alternatively, the striker 61 may be provided at the seat cushion 2, and the latch mechanism 62 may be provided at the baby back 15.

Figure 19:
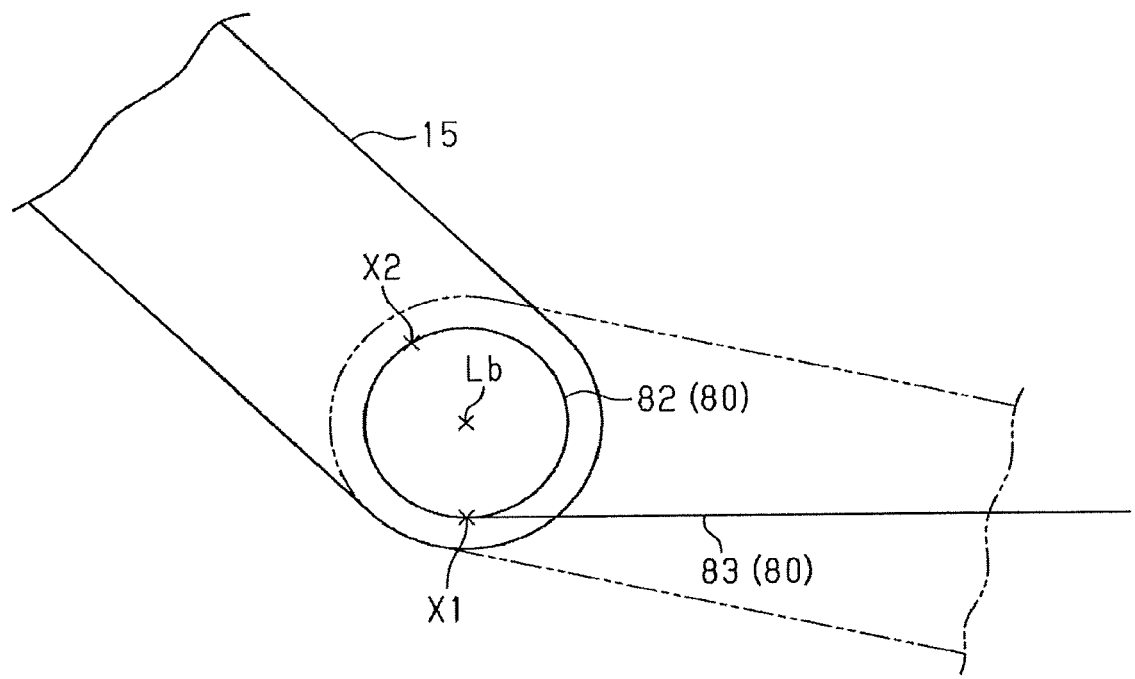
FIG. 19 is a schematic view of a drive device raising the baby back.
Figure 20A:
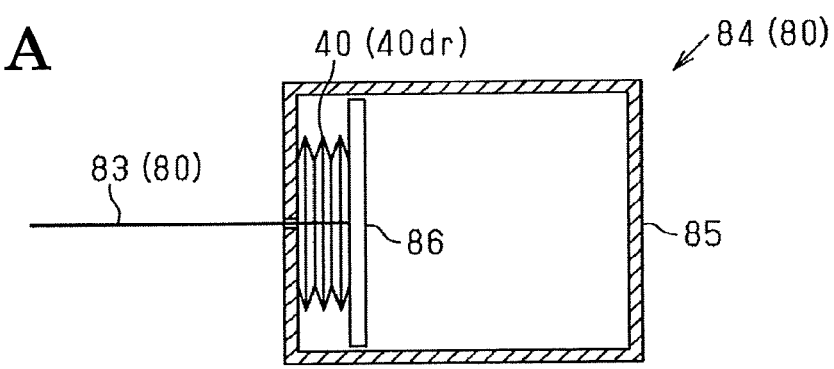
FIG. 20A is a schematic view of an air pressure actuator of the drive device before a wire cable is pulled.
Figure 20B:
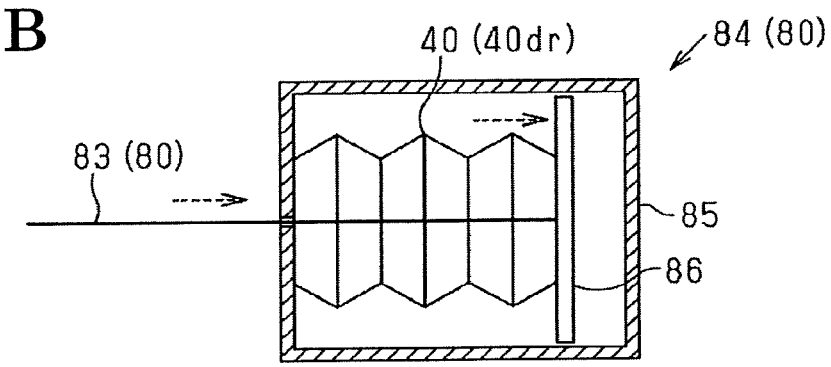
FIG. 20B is another schematic view of the air pressure actuator of the drive device when the wire cable is pulled.

The baby back 15 may be raised by the air pressure. For example, as illustrated in FIGS. 19, 20A, and 20B, a drive device 80 of the baby back 15 operating with the air pressure may include a pulley 82, a wire cable 83, and an air pressure actuator 84. The pulley 82 integrally and axially rotates with the baby back 15. The wire cable 83 includes one end which is connected to the pulley 82. The air pressure actuator 84 pulls the wire cable 83.

That is, as illustrated in FIG. 19, a connection point of the wire cable 83 relative to the pulley 82 moves from a first position X1 to a second portion X2 by the rotation of the pulley 82 in a direction (the clockwise direction in FIG. 19, moving to a position illustrated with a two-dot chain line) in which the pulley 82 is integrally retracted with the baby back 15. Accordingly, the connection point of the wire cable 83 relative to the pulley 82 may be moved in a direction moving from the second point X2 to the first point X1 (the anticlockwise direction in FIG. 19), that is, the connection point may be rotated in the raised direction of the baby back 15 by the pulling of the wire back 83 that is wound by the pulley 82.

The air pressure actuator 84 illustrated in FIGS. 20A and 20B includes an airbag 40 (40dr) as a drive portion, a case 85, and a pulling member 86. The airbag 40 (40dr) expands and contracts in an axial direction (left-right direction in FIGS. 20A and 20B) by being formed in a corrugated shape. The case 85 contains the air bag 40 (40dr). The pulling member 86 moves within the case 85 by being pressed by the expanded airbag 40dr. A second end of the wire cable 83 being connected to the pulley 82 which integrally rotates with the baby back 15 is connected to a side where the airbag 40*dr* expands and contracts (left in FIGS. 20A and 20B) relative to the pulling member 86 of the air pressure actuator 84.

That is, the air pressure actuator 84 pulls the wire cable 83 by the expansion of the airbag 40*dr* by filling air to the airbag 40*dr*. The drive device 80 illustrated in FIGS. 19, 20A and 208, accordingly, may raise the baby back 15 provided at the seat cushion 2 up in response to the air pressure.

According to the aforementioned configuration, the baby back 15 may be automatically raised with a simple configuration by the parallel use of the air pump device 41 and the intake and exhaust valve device 42 (see FIG. 11) that expand and contract the baby back airbags 40 (40*bb*) provided at the baby back 15. Accordingly, the convenience may be enhanced.

The drive device 80 employing the air pressure may be employed to automatically retract the baby back 15. The drive device 80 may be employed for at least one of the inclination and the retraction of the movable cushion 6.

Next, technical ideas understood by the aforementioned embodiment and the modified examples will be described.

A seat device for a vehicle includes a baby back which is a divided part of a seat cushion to be raised, a movable cushion which is a divided part of a seatback to be inclined, and a booster seat which is a divided part of the seat cushion, the booster seat being moved upward from a state where the baby back is integrally retracted with the seat cushion. The seat device for the vehicle includes a baby mode in which the baby back is raised to form a backrest portion of a baby seat at a position opposing the seatback, the baby mode in which the movable cushion is inclined to form a seat portion of the baby seat, a child mode in which the movable cushion is inclined to form the seat portion of the child seat on the seat cushion, the child mode in which the movable cushion is inclined to form the recessed portion at the seatback, the recessed portion constituting the backrest portion of the child seat, and a booster mode in which the booster seat moves upward to form a seat portion for a child at an upper portion of the seat cushion.

According to the aforementioned configuration, three arrangement modes of the seat may be applied to the seat, the modes supporting a case where the occupant corresponds to a child, in addition to a normal mode supporting a case where the occupant corresponds to an adult. Accordingly, the child occupant may be further favorably supported by the selection of the optimal arrangement of the seat, the arrangement that suits for the physical constitution of the child (baby, infant, juvenile) corresponding to the occupant. The baby back, the movable cushion, and the booster seat corresponding to the components of the arrangement modes of the seat may be compactly retracted, and the components may be easily operated. Accordingly, the convenience of the user may be enhanced.

According to the aforementioned embodiment, the seat device (30) for a vehicle includes the baby back (15) being the divided part of the seat cushion (2), the divided part being raised to form the backrest portion (BPb) of the baby seat (20) at the position facing a seatback (3), and the baby back airbag (40, 40*bb*) being provided at the baby back (15). The backrest portion (BPb) of the baby seat (20) is formed with a baby seat support shape (SSb) in a seat width direction by an expansion of the baby back airbag (40, 40*bb*).

According to the aforementioned configuration, the baby back 15 retracted in the seat cushion 2 is raised so that the seat device 30 for the vehicle may be shifted to the baby mode supporting a case where the occupant corresponds to a child (infant) by deploying the baby seat 20 on the seat 1. Here, because the baby back 15 which is raised forms the backrest portion BPb of the baby seat 20 at the position opposing the seatback 3, enhanced security performance may be secured. In a case where the baby seat 20 is not used, the baby back 15 may be compactly retracted in a state of being integrally provided with the seat cushion 2. In addition, because the baby back airbags 40, 40*bb* provided at the baby back 15 expands, the optimal support shape in the seat width direction which suits for the physique of the child corresponding to the occupant may be formed at the backrest portion BPb of the baby seat 20. The load of the occupant applied on the backrest portion BPb may be stably supported by the baby back 15 which relatively easily secures the strength. Thus, according to the aforementioned configuration, the child occupant seated on the baby seat 20 may be favorably supported. Furthermore, the baby back 15 may be compactly retracted relative to the seat cushion 2 by the contraction of the baby back airbags 40, 40*bb*. Accordingly, the thickness of the seat cushion 2 including the baby back 15 may be inhibited from being increased.

According to the aforementioned embodiment, the baby back (15) includes the paddle (57, 57*a*, 57*b*, 57*c*, 57*d*) which is pressed to be rotated by the expanded baby back airbag (40, 40*bb*) to form the baby seat support shape (SSb).

According to the aforementioned configuration, enhanced support strength may be secured by the baby seat support shape SSb of the backrest portion BPb formed by the expansion of the baby back airbags 40, 40*bb*. In addition, the reproduction of the support shape SSb may be enhanced. Accordingly, the favorable support performance in the seat width direction may be applied on the backrest portion BPb of the baby seat 20 deployed on the seat 1.

According to the aforementioned embodiment, the baby back (15) is rotatably connected to the front end portion (2*f*) of the seat cushion (2).

According to the aforementioned configuration, the baby back 15 is rotated to be easily raised on the front end portion 2*f* of the seat cushion 2 to form the backrest portion BPb of the baby seat 20 at the position opposing the seatback 3. In a case where the baby seat 20 is not used, the baby back 15 is inclined to be easily retracted. Accordingly, the convenience may be enhanced.

According to the aforementioned embodiment, the seat device (30) for the vehicle further includes the striker (61) being provided at one of the baby back (15) and the seat cushion (2), and the latch mechanism (62) being provided at the other of the baby back (15) and the seat cushion (2). The latch mechanism (62) retains the baby back (15) in the raised state by being engaged with the striker (61) in a case where the baby back (15) is raised. The latch mechanism (62) includes the elastic body (70) which is engaged with the striker (61) and which is pressed by the striker (61).

According to the aforementioned configuration, the baby back 15 may be easily remained to be raised by the simple configuration. In addition, because the elastic body 70 is elastically deformed by being pressed by the striker 61, the striker 61 engaged with the latch mechanism 62 is inhibited from being moved, that is, the baby back 15 which is maintained in a raised state is inhibited from being backlashed based on the elastic restoration force. Accordingly, the enhanced quality is secured.

According to the aforementioned embodiment, the seat device (30) for the vehicle further includes the movable cushion (6) being the divided part of the seatback (3), the divided part being inclined to form the seat portion (HPb) of the baby seat (20).

According to the aforementioned configuration, the movable cushion 6 integrally retracted with the seatback 3 is inclined to easily form the seat portion HPb corresponding to the occupant of the child (infant) seated on the baby seat 20. In a case where the baby seat 20 is used, the movable cushion 6 may be easily and compactly retracted by being raised to be integral with the seatback 3.

According to the aforementioned embodiment, the movable cushion (6) is inclined in a state where the baby back (15) is integrally retracted with the seat cushion (2) to form a seat portion (HPc) of a child seat (10) on the seat cushion (2). The movable cushion (6) is inclined to form a recessed portion (12) at the seatback (3), the recessed portion (12) constituting the backrest portion (BPc) of the child seat (10).

According to the aforementioned configuration, the movable cushion 6 retracted in the seatback 3 is inclined on the seat cushion 2 so that the seat device 30 for the vehicle may be shifted to the child mode supporting a case where the occupant corresponds to the child (infant) by the easy deployment of the child seat 10 on the seat 1. In a case where the child seat 10 is not used, the movable cushion 6 may be easily and compactly retracted by being raised to be integral with the seatback 3. Because the movable cushion 6 corresponds to both the seat portion HPb of the baby seat 20 and the seat portion HPc of the child seat 10, the configuration may be simplified. Because the seated positions of the child corresponding to the occupant are different relative to the movable cushion 6 (baby seat: distal end, child seat: proximal end), the optimal support structure may be set. The side wall portions 12b of the recessed portion 12 provided at the seatback 3 secure the favorable support performance in the seat width direction. Accordingly, the child occupant seated on the child seat 10 may be favorably supported.

According to the aforementioned embodiment, the seatback (3) includes the seatback airbag (40, 40sb) being expanded inside the recessed portion (12) to form the child seat support shape (SSc) in the seat width direction at the backrest portion (BPc) of the child seat (10) constituted by the recessed portion (12).

According to the aforementioned configuration, the seatback airbag 40sb provided at the recessed portion 12 of the seatback 3 expands to form the optimal support shape in the seat width direction suited for the physique of the child (infant) seated on the child seat 10 at the backrest portion BPc of the child seat 10 formed with the recessed portion 12. Accordingly, further favorable support performance in the seat width direction may be applied.

According to the aforementioned embodiment, the seat device (30) for the vehicle further includes the booster seat (5) being the divided part of the seat cushion (2), the divided part moving upward from a state where the baby back (15) is integrally retracted with the seat cushion (2).

According to the aforementioned configuration, the booster seat 5 moved upward of the seat cushion 2 forms the seat portion HPc for the child. Accordingly, because the seat device 30 for the vehicle is shifted to the booster mode supporting a case where the occupant corresponds to a relatively large child (juvenile), the child occupant may be supported further favorably. In a case of being not used, the booster seat 5 is moved downwardly to be integral with the seat cushion 2 so as to be retracted easily and compactly.

According to the aforementioned embodiment, the booster seat (5) is provided at the baby back (15), the booster seat (5) being pressed to move upward of the seat cushion (2) by the expansion of the booster seat airbag (40, 40bs) being provided between the baby back (15) and the booster seat (5).

According to the aforementioned configuration, the booster seat 5 may be moved upward with the simple configuration. Because of being integrally provided with the baby back 15 with the booster seat airbag 40, 40bs serving as a drive portion, the booster seat 5 may be compactly retracted.

According to the aforementioned embodiment, the seat device (30) for the vehicle further includes the drive device (80) raising the baby back (15) in response to air pressure.

According to the aforementioned construction, the baby back 15 may be automatically raised with the simple configuration by the dual use of the air pump device 41 and the intake and exhaust valve device 42 expanding and contracting the baby back airbags 40, 40bb provided at the baby back 15. Accordingly, the child occupant may be further favorably supported.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat device for a vehicle, comprising:
   a baby back being a first divided part of a seat cushion, the first divided part being raised to form a backrest portion of a baby seat at a position facing a seatback;
   a booster seat being a second divided part of the seat cushion, the second divided part moving upward from a state where the baby back is integrally retracted with the seat cushion; and
   a baby back airbag being provided at the baby back; wherein
   the backrest portion of the baby seat is formed with a baby seat support shape in a seat width direction by an expansion of the baby back airbag, and
   the booster seat is provided at the baby back, the booster seat being pressed to move upward of the seat cushion by the expansion of a booster seat airbag being provided between the baby back and the booster seat.

2. The seat device for the vehicle according to claim 1, wherein the baby back includes a paddle which is pressed to be rotated by the expanded baby back airbag to form the baby seat support shape.

3. The seat device for the vehicle according to claim 1, wherein the baby back is rotatably connected to a front end portion of the seat cushion.

4. The seat device for the vehicle according to claim 2, wherein the baby back is rotatably connected to a front end portion of the seat cushion.

5. The seat device for the vehicle according to claim 1, further comprising:
   a striker being provided at one of the baby back and the seat cushion; and
   a latch mechanism being provided at the other of the baby back and the seat cushion; wherein the latch mechanism retains the baby back in a raised state by being engaged with the striker in a case where the baby back is raised; and the latch mechanism includes an elastic body which is engaged with the striker and which is pressed by the striker.

6. The seat device for the vehicle according to claim 2, further comprising:
- a striker being provided at one of the baby back and the seat cushion; and
- a latch mechanism being provided at the other of the baby back and the seat cushion; wherein
- the latch mechanism retains the baby back in a raised state by being engaged with the striker in a case where the baby back is raised; and
- the latch mechanism includes an elastic body which is engaged with the striker and which is pressed by the striker.

7. The seat device for the vehicle according to claim 3, further comprising:
- a striker being provided at one of the baby back and the seat cushion; and
- a latch mechanism being provided at the other of the baby back and the seat cushion; wherein
- the latch mechanism retains the baby back in a raised state by being engaged with the striker in a case where the baby back is raised; and
- the latch mechanism includes an elastic body which is engaged with the striker and which is pressed by the striker.

8. The seat device for the vehicle according to claim 1, further comprising a movable cushion being a third divided part of the seatback, the third divided part being inclined to form a seat portion of the baby seat.

9. The seat device for the vehicle according to claim 8, wherein
- the movable cushion is configured to switch between a state of being integrally retracted with the seatback and a state of being inclined toward the seat cushion;
- when the movable cushion is inclined to the state of being inclined toward the seat cushion and the baby back is integrally retracted with the seat cushion, the movable cushion forms the seat portion of a child seat; and
- a recessed portion at the seatback constituting a backrest portion of the child seat is formed by the movable cushion switching to the state of being inclined toward the seat cushion.

10. The seat device for the vehicle according to claim 9, wherein the seatback includes a seatback airbag being expanded inside the recessed portion to form a child seat support shape in a seat width direction at a backrest portion of the child seat constituted by the recessed portion.

11. The seat device for the vehicle according to claim 1, further comprising a drive device raising the baby back in response to air pressure.

12. The seat device for the vehicle according to claim 2, further comprising a drive device raising the baby back in response to air pressure.

13. The seat device for the vehicle according to claim 5, further comprising a drive device raising the baby back in response to air pressure.

14. The seat device for the vehicle according to claim 8, further comprising a drive device raising the baby back in response to air pressure.

15. The seat device for the vehicle according to claim 1, further comprising a drive device raising the baby back in response to air pressure.

\* \* \* \* \*